Figure 1:
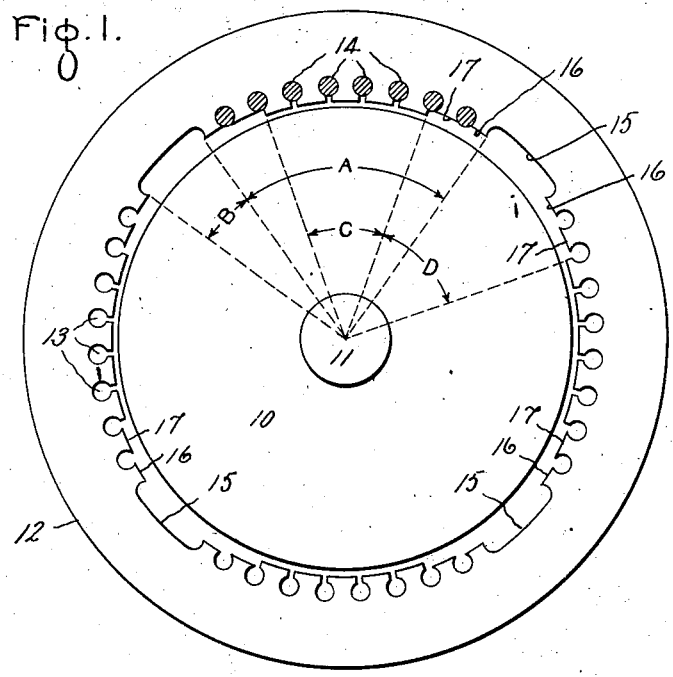

Feb. 22, 1927.

F. W. MERRILL

SYNCHRONOUS INDUCTION MOTOR

Filed March 24, 1925

1,618,771

Inventor:
Frank W. Merrill,
by
His Attorney.

Patented Feb. 22, 1927.

1,618,771

UNITED STATES PATENT OFFICE.

FRANK W. MERRILL, OF FORT WAYNE, INDIANA, ASSIGNOR TO GENERAL ELECTRIC COMPANY, A CORPORATION OF NEW YORK.

SYNCHRONOUS INDUCTION MOTOR.

Application filed March 24, 1925. Serial No. 17,979.

My invention relates to synchronous induction motors, and its object is to improve the starting and synchronous characteristics of this type of motor.

It is known that if the secondary iron of an induction motor is shaped so as to have salient poles of the same number as that of the primary winding, the motor will pull into synchronism and operate at a true synchronous speed provided the load is not too high. The salient pole feature naturally gives the motor poorer starting characteristics and may produce dead points particularly if the motor is single phase.

One object of my invention is to provide the salient pole effect with the least possible disturbance of the conditions necessary for proper starting. Another detrimental characteristic common to the synchronous induction motor is the considerable change in the angular position of the secondary member with respect to the rotating magnetic field of the primary when operating in synchronism due to relatively small changes in load, or changes in the supply voltage. This change is of no particular importance when the motor is used to drive a non-electrical device having no relation to the phase angle of the supply circuit. However, when used to drive a mechanical rectifier supplied from the same circuit, variation in the angle of lag due to ordinary variation in the supply voltage may have detrimental effects upon commutation since it produces a shift in the point at which the alternating current wave is commutated.

Another object of my invention is to provide a motor of the type under discussion having relatively small changes in the lag angle per pole arc due to small variations in load or supply voltage and a greater synchronous output for a given angle of lag.

At the instant of starting the magnetizing current is high and the air gap flux is more evenly distributed than at synchronous speed. In carrying my invention into effect I take advantage of the change in the density and distribution of the air gap flux between starting and synchronous conditions in arranging the secondary iron and conductors to obtain the best compromise between starting and synchronous characteristics.

The features of my invention which are believed to be novel and patentable will be pointed out in the claims appended hereto. For a better understanding of my invention reference is made in the following description to the accompanying drawing in which Figs. 1 and 2 represent slightly different modifications of my invention where the secondary member of the motor is made the stator element, and Fig. 3 represents the manner of energizing this type of motor through slip rings.

Figure 2:
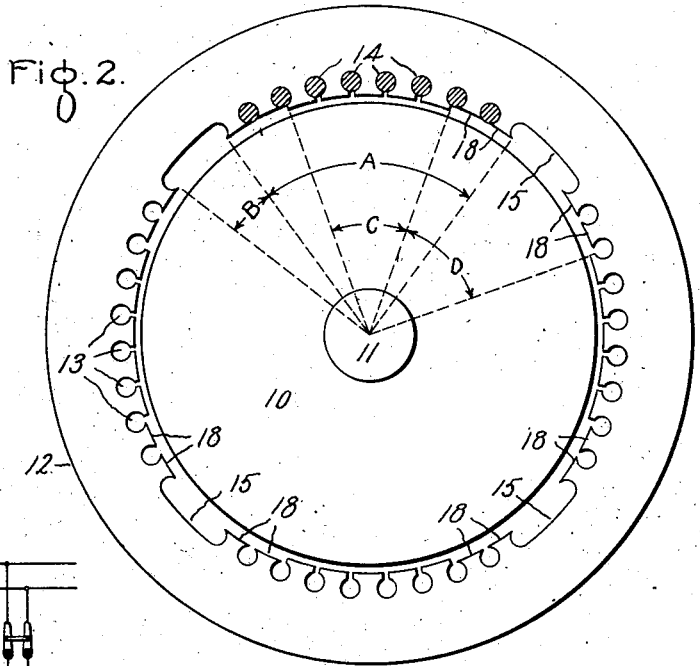
Figure 3:
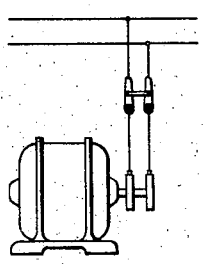

Referring to the drawing, Figs. 1 and 2 represent views of the primary rotor and secondary stator of synchronous induction motors built in accordance with my invention. The rotor element 10 is mounted on a shaft 11 and has the usual type of primary winding distributed in peripheral slots. The primary winding is connected to slip rings as represented in Fig. 3 in a well-known manner. Since there is nothing unusual about this type of primary it is merely represented in outline. The secondary member is made up of laminations 12 having slots 13 in its inner periphery for the insertion of the induction motor secondary winding here represented as squirrel cage bars 14. The end rings and most of the bars have been omitted from the drawing for the sake of simplicity. Preferably the bars will be uniformly distributed about the entire periphery. It will be noted that the laminations here represented are designed to produce four salient poles and are for a four-pole motor. The salient poles are produced in this case by taking a standard 44-tooth lamination and cutting off two teeth even with the bottom of the slots at four equally spaced points as at 15. Between each salient pole thus formed two teeth are omitted. It will be noted that in Fig. 1 the teeth 16 next to the openings 15 are cut off nearly halfway and that the second set of teeth 17 from the openings 15 are cut off to a less extent. In Fig. 2 the two teeth 18 next adjacent the openings 15 are both cut off equally.

With such a motor the heavy magnetizing current during the starting period will be sufficient to send considerable flux through the partly cut away teeth 16 and 17. The reluctance through the outer teeth of each pole is not excessive and the flux through the air gap at starting spreads out over the entire pole represented by the salient angle A which in this case is 69°. This spreading out of the flux is assisted by the secondary current distribution which is explained as follows:—The flux through the air gap is opposed by a counter flux set up due to the current in the secondary and the secondary currents will be the greatest where the primary flux is the greatest. Now if the secondary current in the outer bars of each pole is lighter than that flowing in the bars at the center of the pole, there will be less opposition to the flux due to this condition at the outer edges of the poles. It will also be appreciated that during the starting period when the rotating magnetic field of the primary has a high velocity with respect to the secondary, the flux of the primary opposite to the high reluctance gaps 15 in the stator iron tend to pass through the nearest teeth, which are 16 and 17. These factors tend toward the full utilization of the salient A for induction motor action during the starting period.

As the motor pulls into synchronism the magnetizing current becomes greatly reduced, and the primary flux instead of revolving with respect to the secondary is now stationary with respect thereto and has alternate positive and negative values which remain fixed with respect to the salient poles of the secondary. The low reluctance path represented by the five middle teeth of each pole is sufficient to carry this flux and holds the motor in synchronism and substantially no flux passes through the shorter teeth. The angle of lag is small and consequently the variation in the angle of lag due to changes in voltage or changes in load within the synchronous load limits of the motor is small. At starting the effective iron salient angle was $A=69°$ which is reduced to angle $C=39°$ at synchronous speed. At starting the inactive iron salient is represented by the angle $B=21°$ which is increased to the angle $D=51°$ at synchronous speed. I have in this manner largely increased the starting torque of this type of motor and decreased the possibility of dead points, at the same time improved the synchronous operation.

The modification shown in Fig. 2 is similar in principle to that shown in Fig. 1.

This invention is applicable to both single and polyphase motors and is not dependent upon having the primary the rotating element. The dimensions represented in Figs. 1 and 2 have been found satisfactory for a four-pole motor. For other pole numbers the dimensions will be changed accordingly. The secondary laminations may be obtained by cutting away teeth in laminations made for a straight induction motor of similar size as is herein represented, or the laminations may be stamped with a special die giving a somewhat different shaped lamination than is herein represented. The essential feature of the invention is to have portions of the secondary adjacent the salient poles so proportioned with the remainder of the structure as to be available for induction motor action during the starting operation without appreciably increasing the salient pole area utilized for synchronous operation.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. A synchronous induction motor comprising relative rotatable primary and secondary members, the secondary member obtaining its excitation entirely from the primary member and having salient poles which carry conductors of a secondary induction motor winding, the tip of the salient poles being stepped off to increase the air gap between primary and secondary sufficiently to produce a substantial decrease in the effective polar salient between starting and synchronous operations.

2. A secondary member for a synchronous induction motor comprising a laminated structure having salient poles provided with slots and teeth, secondary winding conductors in said slots, the teeth adjacent the pole tip of said salients being shortened to provide areas which are effective to carry a substantial part of the motor flux only during the starting operation.

3. A synchronous induction motor having relatively rotating primary and secondary members, the secondary member having salient poles formed by groups of projecting teeth, a secondary winding in the slots formed between said teeth, and between said salients, the outer teeth of each group being shortened to such an extent as to carry substantial flux during the starting operation but being substantially free from flux at synchronous speed.

4. A synchronous induction motor having relatively rotating primary and secondary members, the secondary member having magnetic areas of different air gap reluctance with respect to the primary member, comprising regularly occurring areas of low reluctance forming salient poles, regularly occurring areas between said salient poles of high reluctance, and areas between the salient poles and the high reluctance areas having a reluctance sufficiently low as to carry flux during the induction motor starting period, but sufficiently high as to be substantially free of flux during synchronous operation.

5. A synchronous induction motor comprising cooperating primary and secondary members, the primary member having a distributed winding and the secondary member having a salient pole magnetic structure, the polar projections of which have their central portions extending more closely to the primary member than the pole tip portions, a squirrel cage winding carried by said secondary member, the bars of which are uniformly distributed around the periphery, said parts being so proportioned as to obtain flux distribution over the entire polar projections of the secondary during the induction motor starting period and over only the central portions during synchronous operation.

In witness whereof, I have hereunto set my hand this 20th day of March, 1925.

FRANK W. MERRILL.